T. A. HOOKEY.
LOCK NUT.
APPLICATION FILED AUG. 21, 1912.
1,061,842.
Patented May 13, 1913.
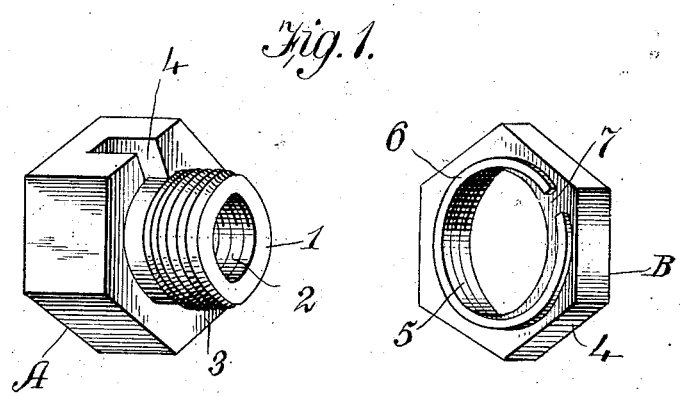
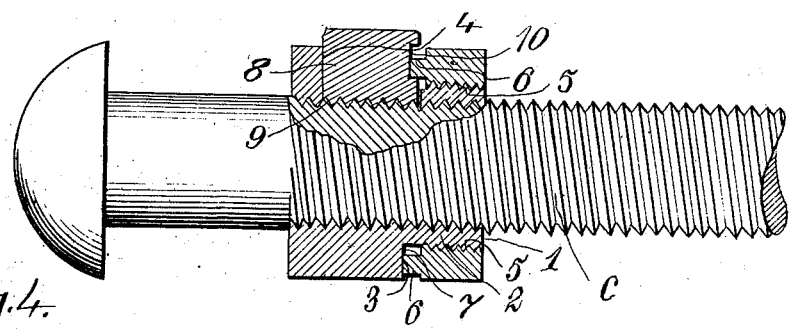
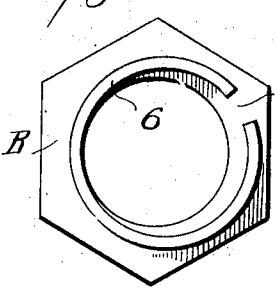
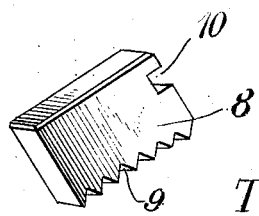
Witnesses
Raymond L. Gilbert
Carroll Bailey
Inventor
Thomas A. Hookey
By Victor J. Evans
Attorney

UNITED STATES PATENT OFFICE.

THOMAS A. HOOKEY, OF McDONALD, PENNSYLVANIA.

LOCK-NUT.

1,061,842. Specification of Letters Patent. Patented May 13, 1913.

Application filed August 21, 1912. Serial No. 716,342.

*To all whom it may concern:*

Be it known that I, THOMAS A. HOOKEY, a citizen of the United States, residing at McDonald, in the county of Washington and State of Pennsylvania, have invented new and useful Improvements in Lock-Nuts, of which the following is a specification.

The present invention relates to improvements in nut locks.

In carrying out my invention it is my purpose to provide a nut comprising two sections, one of which having a sleeve, while the second section is arranged upon the sleeve and is adapted to act upon a key to slide the same within the bore of the first named section to cause the key to contact with the bolt to lock the nut upon the bolt, when the said second section is rotated in one direction, and to cause the key to release the bolt when the section is rotated in an opposite direction.

With the above, and other objects in view which will appear as the nature of the invention is more fully understood, the invention resides in the construction, combination and arrangement of parts set forth in the following description, and falling within the scope of the appended claims.

In the drawings, Figure 1 is a perspective view of the sections of the nut disassembled. Fig. 2 is a central longitudinal sectional view taken through the nut and arranged upon a bolt. Fig. 3 is a perspective view of the key. Fig. 4 is a detail view more fully illustrating the arrangement of the flange 6 of the nut section B.

Similar reference characters are employed to designate corresponding parts throughout the several views.

Referring now to the drawing in detail, A designates the main section of the nut, and B the auxiliary or locking section thereof. The section A is provided with a centrally arranged projecting sleeve 1, the same having its bore threaded as designated by the numeral 2, the threads of the bore forming extensions of the threads of the nut section A. The outer face of the sleeve 1 is also threaded as designated by the numeral 3, and the nut proper as well as its sleeve adjacent the juncture of the said sleeve with the nut are provided with a substantially rectangular recess 4.

The section B has its bore threaded as at 5, the said threads adapted to co-act with the threads 3 of the sleeve 2, and the inner face of the said section B is provided with an eccentrically arranged flange 6. The flange 6 is not continuous, but is broken at the portion of the flange nearest the perimeter of the locking section B, as indicated by the numeral 7. The space between the ends of the flange equals or is slightly greater than the distance between the longitudinal walls provided by the recess 4 of the nut section A.

The numeral 8 designates the locking key for the device. The locking key comprises a substantially rectangular member which is adapted to be snugly received within the recess 4, and which has one of its edges formed with teeth 9, the said teeth being adapted to tightly compress against the thread of the bolt C in a manner which will presently be set forth. The key 8 has one of its transverse edges formed with an opening or depression, 10, the same being of a width sufficient to snugly receive the eccentrically arranged flange 6 of the nut section B.

By an arrangement as above described, it will be noted that by arranging the key 8 within the recess 4, and screwing the section B upon the threads 3 of the sleeve 1 in order to permit of the depression 10 of the said key being engaged by the flange 6, the revolving of the section B in one direction will effectively force the teeth 9 of the key tightly into engagement with the threads of the bolt C, while a movement in a reverse direction will withdraw the teeth of the key 8 from engagement with the threads of the bolt. Furthermore, it will be noted that by forming the flange 6 with a cut-away portion or passage between the ends thereof, the key 8 may be readily withdrawn when the said passage is brought into register with the recess 4. It will be also noted that the section B will force the key longitudinally within the recess 4, and the said action not only forces its teeth 9 against the threads of the bolt C, but causes the said key to frictionally contact with the inner wall of the recess to more securely sustain the sections of the lock nut together and the lock-nut upon the bolt.

It will be noted by reference to Fig. 1 of the drawing that the threads 3 of the sleeve shall terminate thereon a suitable distance away from the face of the nut A, upon which the said sleeve is formed, and so the end of the key provided with the opening 10 will extend beyond the face of the nut a distance substantially equal to the unthreaded portion of the sleeve, and when the lock nut B is screwed upon the said stem the space between the ends of the flange 6 will provide for the said flange engaging within the recess of the key, which, engagement, as above stated, will first force the key snugly within the pocket or recess 4 and then force the threads 9 tightly into engagement with the threads of the bolt C.

Having thus described the invention, what I claim is:—

A nut lock embodying a pair of separable sections, one of said sections being provided with a sleeve which has its outer face threaded at a distance away from its juncture with the section and the bore of said sleeve being also provided with threads which provide a continuation of the threads of the bore of the nut section, the face of this section as well as the unthreaded portion of the stem thereof being formed with an opening which enters the bore thereof, a slidable key having teeth upon one of its edges and adapted to be arranged within the opening and to be guided by the walls thereof, the said key having one of its faces extending beyond the nut section, and the said extending portion being provided with a transversely arranged slot, the second nut section being arranged for rotation upon the sleeve, the inner face of the said second section being provided with an eccentrically arranged split flange, the opening or split of the flange being arranged near the perimeter of the said section, and the said flange adapted to coact with the depression of the key when the said section is rotated in either direction upon the sleeve to force the key tightly within the opening of the first nut section and sleeve as well as the teeth thereof vertically into engagement with the thread of the bolt within the bore of the nut when the said second section is rotated upon the sleeve in one direction, and to raise the key out of the bore of the nut when the said second section is rotated upon the sleeve in a second or reverse direction.

In testimony whereof I affix my signature in presence of two witnesses.

THOMAS A. HOOKEY.

Witnesses:
W. F. KARNS,
W. B. SMITH.

Copies of this patent may be obtained for five cents each, by addressing the "Commissioner of Patents, Washington, D. C."